US008935096B2

(12) United States Patent
Choi et al.

(10) Patent No.: US 8,935,096 B2
(45) Date of Patent: Jan. 13, 2015

(54) APPARATUS FOR FAST PATH SEARCH BY LEARNING HEURISTIC FUNCTION AND METHOD THEREOF

(71) Applicant: Electronics and Telecommunications Research Institute, Daejeon (KR)

(72) Inventors: Sung Lok Choi, Gyeonggi-do (KR); Hee Sung Chae, Daejeon (KR); Won Pil Yu, Ulsan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 36 days.

(21) Appl. No.: 13/646,972

(22) Filed: Oct. 8, 2012

(65) Prior Publication Data
US 2013/0253827 A1 Sep. 26, 2013

(30) Foreign Application Priority Data

Mar. 26, 2012 (KR) .................. 10-2012-0030730

(51) Int. Cl.
*G01C 21/00* (2006.01)
*G01C 21/34* (2006.01)

(52) U.S. Cl.
CPC .................. *G01C 21/3446* (2013.01)
USPC ....................................................... 701/533

(58) Field of Classification Search
CPC ............................................. G01C 21/3446
USPC ......................................................... 701/36
See application file for complete search history.

(56) References Cited

U.S. PATENT DOCUMENTS

| 5,983,220 | A | * | 11/1999 | Schmitt | 1/1 |
| 6,463,431 | B1 | * | 10/2002 | Schmitt | 1/1 |
| 8,014,941 | B2 | * | 9/2011 | Nagel et al. | 701/423 |
| 8,811,666 | B2 | * | 8/2014 | Maki et al. | 382/103 |
| 2003/0135541 | A1 | * | 7/2003 | Maeda et al. | 709/202 |
| 2010/0332121 | A1 | * | 12/2010 | Okude et al. | 701/201 |
| 2011/0002509 | A1 | * | 1/2011 | Nobori et al. | 382/103 |
| 2011/0013840 | A1 | * | 1/2011 | Iwasaki et al. | 382/173 |
| 2011/0228987 | A1 | * | 9/2011 | Iwasaki et al. | 382/107 |

FOREIGN PATENT DOCUMENTS

| EP | 2428771 A1 | * | 3/2012 |
| WO | WO2006080996 A3 | * | 8/2006 |

OTHER PUBLICATIONS

Ramon Lawrence et al., "Taking Learning out of Real-time Heuristic Search for Video-game Pathfinding," Proceedings of the 23th Australasian Joint Conference on Artificial Intelligence (AI), Dec. 7-10, 2010, pp. 405-414.

* cited by examiner

Primary Examiner — John R Olszewski
Assistant Examiner — Jean-Paul Cass
(74) Attorney, Agent, or Firm — Rabin & Berdo, P.C.

(57) ABSTRACT

Disclosed are an apparatus and a method for fast path search using learning of a heuristic function according to the present invention. An apparatus for fast path search according to the present invention includes: an input unit to receive destination information from a user, and to receive a search request for a path to the received destination information; a location recognizing unit to obtain current location information of the user when the search request for the path is received; and a control unit to search a map for a path from a start node corresponding to the current location information to a destination node corresponding to the destination information using a heuristic evaluation function.

6 Claims, 5 Drawing Sheets

APPARATUS FOR FAST PATH SEARCH BY LEARNING HEURISTIC FUNCTION AND METHOD THEREOF

CROSS-REFERENCE TO RELATED APPLICATIONS

This application claims priority to and the benefit of Korean Patent Application No. 10-2012-0030730 filed in the Korean Intellectual Property Office on Mar. 26, 2012, the entire contents of which are incorporated herein by reference.

TECHNICAL FIELD

The present invention relates to a path search method, and more particularly, to an apparatus and method for fast path search using learning of a heuristic function that learns a heuristic function, generates a heuristic set using the learning result, and uses the generated heuristic set for a path search process, so as to make it possible to quickly search for an available path while taking into consideration of an obstacle.

BACKGROUND ART

A path plan is to generate an available path from a given start point to a destination. The path plan is an important technology that is applied to various fields such as an autonomous drive of a moving robot, a motion generation of a game character, a road guide of a vehicle navigation system, and the like. One of the most important factors in the path plan is a search time. When the moving robot encounters an obstacle not displayed on a map, the path plan needs to be performed again. A long search time does not prevent the robot from running into an obstacle, and instead causes an unnatural operation (for example, pause and then move). In a game in which a plurality of characters appears, the above long path search time becomes a serious issue. When a path search time of a vehicle navigation system increases, a user may feel great inconvenience. Accordingly, there is a need for a fast path plan technology having a fast search speed.

In a mathematical aspect, a path plan issue becomes a graph search issue. In general, a graph search algorithm using a heuristic function such as A* algorithm is generally used. The graph search algorithm using the heuristic function initially searches a graph for a node close to a destination and thus, a search may be relatively quickly performed. When a searchable node is given as n and a destination node is given as t, one of frequently used heuristic functions is a lineal distance between two nodes as expressed by the following Equation 1.

$$h(n,g) = \sqrt{(n \cdot x - g \cdot x)^2 + (n \cdot y - g \cdot y)^2} \quad \text{[Equation 1]}$$

Here, n·x denotes an x value of a current node, g·x denotes an x value of a destination node, n·y denotes a y value of the current node, and g·y denotes a y value of the destination node.

A searchable node close to a destination node based on a lineal distance using a heuristic function is initially visited. However, when a space to be searched is complex, a distance between the searchable node and the destination node may not be accurately expressed by the simple lineal distance. For example, when a detour needs to be performed due to a predetermined obstacle present between the searchable node and the destination node, the heuristic function using the lineal distance does not consider the obstacle and has a small value.

SUMMARY OF THE INVENTION

The present invention has been made in an effort to provide an apparatus and method for fast path search using learning of a heuristic function that learns a heuristic function, generates a heuristic set using the learning result, and uses the generated heuristic set for a path search process, so as to make it possible to quickly search for an available path while taking into consideration of an obstacle.

However, the object of the present invention is not limited to the above-described matter and other objects not described above may be clearly understood to those skilled in the art from the following description.

An exemplary embodiment of the present invention provides an apparatus for fast path search, including: an input unit to receive current location information and destination information from a user, and to receive a search request for a path to the received destination information; and a control unit to search a map for a path from a start node corresponding to the current location information to a destination node corresponding to the destination information using a heuristic evaluation function.

The heuristic evaluation function may be expressed as a summation of a first cost from the start node to a node to move on the path and a second cost from the node to move to the destination node. Here, the path from the start node to the destination node may be selected as a path for avoiding an obstacle on the map.

The control unit may select a node to be movable from the start node. The control unit may calculate an estimated cost by applying the heuristic evaluation function to the selected node, select a node having a minimum estimated cost among the calculated estimated costs, and select the selected node having the minimum estimated cost as a subsequent node to move.

The control unit may verify whether the selected subsequent node to move is the destination node. When the selected subsequent node to move is not the destination node as the verification result, the control unit may repeatedly perform a process of selecting a node to be movable from the selected node and selecting a node having a minimum cost from among the selected nodes to be movable.

The control unit may verify whether the selected subsequent node to move is the destination node. When the selected subsequent node to move is the destination node as the verification result, the control unit may determine a path that includes the selected subsequent node to move from the start node.

The heuristic evaluation function may be expressed as a summation of a first cost from the start node to a node to move on the path and a second cost from the node to move to the destination node. In this instance, the second cost may use a cost that is calculated by multiplying a lineal distance from the node to move to the destination node by a distance weight. Here, the path from the start node to the destination node may be selected as a path for avoiding an obstacle on the map.

The distance weight may divide the map into a plurality of spaces and indicate a ratio of a distance between two divided spaces to the average lineal distance.

Another exemplary embodiment of the present invention provides a method for fast path search, including: receiving destination information from a user to receive a search request for a path to the received destination information; obtaining current location information of the user when the search request for the path is received; and searching a map for a path from a start node corresponding to the current location information to a destination node corresponding to the destination information using a heuristic evaluation function.

The heuristic evaluation function may be expressed as a summation of a first cost from the start node to a node to move on the path and a second cost from the node to move to the destination node. Here, the path from the start node to the destination node may be selected as a path for avoiding an obstacle on the map.

The searching may select a node to be movable from the start node. The searching may calculate an estimated cost by applying the heuristic evaluation function to the selected node, select a node having a minimum estimated cost among the calculated estimated costs, and select the selected node having the minimum estimated cost as a subsequent node to move.

The searching may verify whether the selected subsequent node to move is the destination node. When the selected subsequent node to move is not the destination node as the verification result, the searching may repeatedly perform a process of selecting a node to be movable from the selected node and selecting a node having the minimum cost from among the selected nodes to be movable.

The searching may verify whether the selected subsequent node to move is the destination node. When the selected subsequent node to move is the destination node as the verification result, the searching may determine a path that includes the selected subsequent node to move from the start node.

The heuristic evaluation function may be expressed as a summation of a first cost from the start node to a node to move on the path and a second cost from the node to move to the destination node. In this instance, the second cost may use a cost that is calculated by multiplying a lineal distance from the node to move to the destination node by a distance weight. The path from the start node to the destination node may be selected as a path for avoiding an obstacle on the map.

The distance weight may divide the map into a plurality of spaces and indicate a ratio of a distance between two divided spaces to the average lineal distance.

According to exemplary embodiments of the present invention, it is possible to perform an efficient path search by learning a heuristic function, by generating a heuristic set using the learning result, and by using the generated heuristic set for a path search process, so as to make it possible to quickly search for an available path while taking into consideration of an obstacle.

According to exemplary embodiments of the present invention, it is possible to perform a fast path search by learning a heuristic function, by generating a heuristic set using the learning result, and by using the generated heuristic set for a path search process, so as to make it possible to quickly search for an available path while taking into consideration of an obstacle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
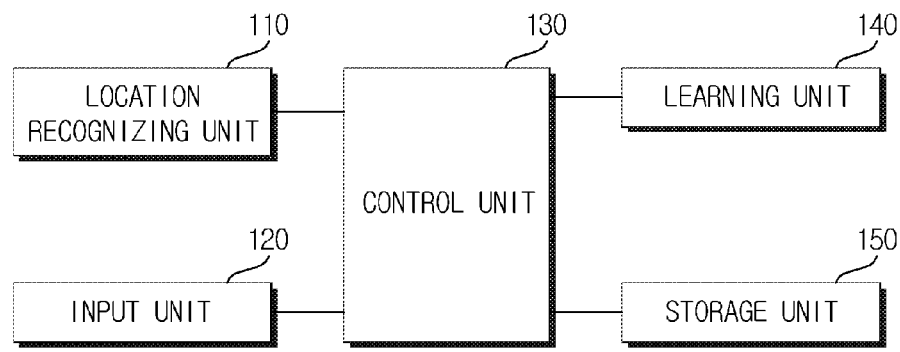
FIG. 1 is a block diagram illustrating an apparatus for fast path search according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus and a method for fast path search using learning of a heuristic function according to exemplary embodiments of the present invention will be described in detail with reference to FIGS. 1 through 7. A description will be made in detail based on a portion required to understand an operation and a function according to the present invention. When assigning reference numerals to constituent elements of each drawing, like reference numerals refer to like elements throughout the specification, even though they are illustrated in different drawings. When it is determined the detailed description related to a related known function or configuration may make the purpose of the present invention unnecessarily ambiguous in describing the present invention, the detailed description will be omitted here.

In particular, the present invention proposes a new method that learns a heuristic function, generates a heuristic set using the learning result, and uses the generated heuristic set for a path search process, so as to make it possible to quickly search for an available path while taking into consideration of an obstacle.

FIG. 1 is a block diagram illustrating an apparatus for fast path search according to an exemplary embodiment of the present invention.

As shown in FIG. 1, the apparatus for fast path search according to the present invention may include a location recognizing unit 110, an input unit 120, a control unit 130, a learning unit 140, a storage unit 150, and the like.

The location recognizing unit 110 may obtain location information that is calculated using a signal present in an operational environment, for example, a global positioning system (GPS) signal, a wireless local area network (WLAN) signal, and the like, or a marker and the like.

The input unit 120 may receive, from a user, a request for selecting a destination and a drive path, a request for searching a map, and the like.

The learning unit 140 may generate and update a heuristic set by learning a heuristic function. That is, prior to performing an actual path search, the learning unit 140 may generate the heuristic set by performing a search path on a predetermined map the predetermined number of times. Here, the map is gridded based on a predetermined size and each of gridded areas is referred to as a node.

Here, the heuristic set refers to a set of elements indicating a state between two nodes. Elements that constitute the heuristic set are expressed as (p, q, cost). Here, p denotes a first node, q denotes a second node, and cost denotes a distance between the node p and the node q or a cost.

Here, a memory occupancy amount of the heuristic set may be great, which may be compressed through clustering. For the above operation, elements of the heuristic set may be expanded to be (p, q, cost, p_std, q-std). Here, p_std denotes a range value of the first node, for example, a standard deviation, and q_std denotes a range value of the second node.

Every time a predetermined path is generated, the learning unit 140 adds the search result to the heuristic set as an element.

The control unit 130 may be a microprocessor for controlling all the units within the apparatus for fast path search. When a destination is received from the user, the control unit 130 may search for a path using the heuristic function based on the received destination and received current location information.

That is, the control unit 130 may select neighbor nodes to be movable from a start node corresponding to the current location information, and may calculate an estimated cost by applying a heuristic evaluation function to each of the selected neighbor nodes.

The control unit 130 may select, as a subsequent node to move, a node having a smallest estimated cost among the calculated estimated costs. The control unit 130 may repeat a process from a process of selecting neighbor nodes to be movable from the selected node.

Here, the learned heuristic evaluation function may calculate an estimated cost to a destination node while taking into consideration of an obstacle present on the path and the like, instead of a lineal distance to the destination node on the map.

The above path search process will be described in detail with reference to FIGS. 2 through 5.

Figure 2:
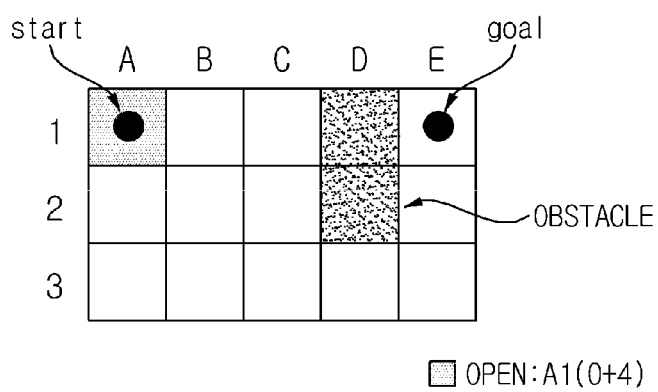
FIG. 2 is a first diagram to describe a process for fast path search according to an exemplary embodiment of the present invention.
Figure 3A:
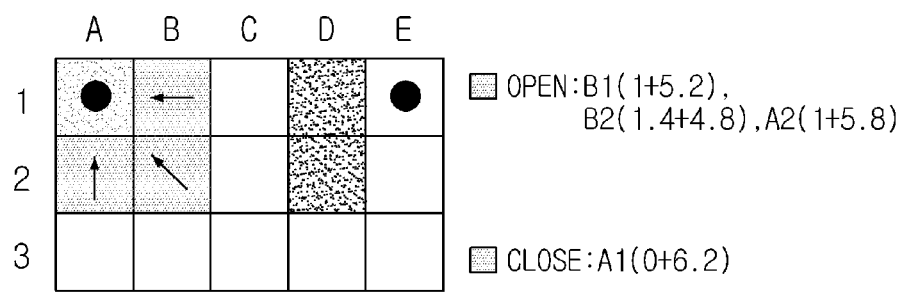
FIGS. 3A and 3B are second diagrams to describe a process for fast path search according to an exemplary embodiment of the present invention.
Figure 3B:
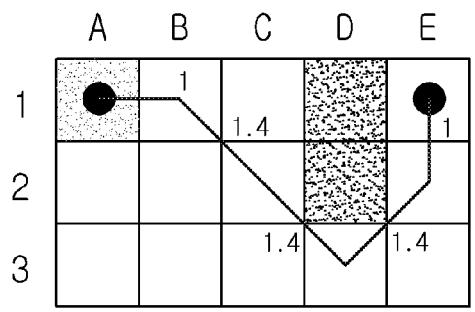
Figure 4:
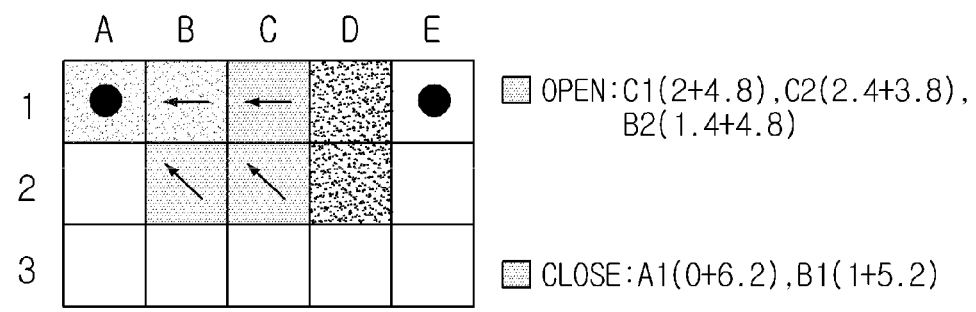
FIG. 4 is a third diagram to describe a process for fast path search according to an exemplary embodiment of the present invention.
Figure 5:
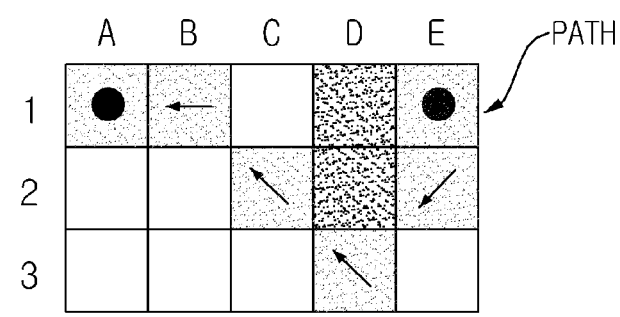
FIG. 5 is a fourth diagram to describe a process for fast path search according to an exemplary embodiment of the present invention.

FIG. 2 is a first diagram to describe a process for fast path search according to an exemplary embodiment of the present invention, FIGS. 3A and 3B are second diagrams to describe a process for fast path search according to an exemplary embodiment of the present invention, FIG. 4 is a third diagram to describe a process for fast path search according to an exemplary embodiment of the present invention, and FIG. 5 is a fourth diagram to describe a process for fast path search according to an exemplary embodiment of the present invention.

Referring to FIGS. 2 through 5, when searching for a path between a start node A1 and a destination node E1, the start node A1 and the destination node E may be set on a map that includes obstacles D1 and D2 as shown in FIG. 2. Here, the start node A1 belongs to an open group indicating a node to be searched, and none of nodes belongs to a close group indicating a search completed node.

Three nodes A2, B1, and B2 are present as nodes movable from the start node A1. An estimated cost is calculated by applying the heuristic evaluation function f(node) to each of the nodes A2, B1, and B2 from the stat node A1. The heuristic evaluation function f(node) may be expressed by the following Equation 2.

$$f(\text{node}) = \text{cost}(\text{start}, \text{node}) + \text{heuristic}(\text{node}, \text{goal}) \quad \text{[Equation 2]}$$

Here, node may denote a current node, start may denote the start node, and goal may denote the destination node. Cost (start, node) may denote a cost or a distance from the start node to the current node, and heuristic (node, goal) may denote a cost or a distance based on an obstacle present in a path from the current node to the destination node.

As shown in FIG. 3A, an estimated cost of the node B1 may become 6.2(1+5.2), an estimated cost of the node B2 may be 6.2(1.4+4.8), and an estimated cost of the node A2 may be 6.8(1+5.8). Among the nodes A2, B1, and B2, the node B1 having the smallest estimated cost may be set as a subsequent node to move. Here, the estimated cost of the node B1 is equal to the estimated cost of the node B2 and one of the nodes B1 and B2 is selected based on a distance from the start node A1. Here, a lineal distance between the respective nodes may be expressed as 1 and a diagonal distance between the respective nodes may be expressed as 1.4.

In this instance, three nodes B1, B2, and A2 belong to an open group indicating a node to be searched. The node A1 belongs to a close group indicating a search completed node.

As shown in FIG. 3B, the estimated cost of the node B1 is a summation of 1 from the node A1 to B1, 1.4 from the node B1 to C2, 1.4 from C2 to D3, 1.4 from D3 to E2, and 1 from E2 to E1.

As shown in FIG. 4, three nodes B2, C1, and C2 adjacent to the node B1 are present as a subsequent node. An estimated cost is calculated by applying the heuristic evaluation function f(node) to each of the nodes B2, C1, and C2 from the start node A1.

In this instance, the nodes B2, C1, and C2 belong to an open group indicating a node to be searched. The nodes A1 and B1 belong to a close group indicating a search completed node.

As shown in FIG. 5, the control unit 130 determines A1, B1, C2, D3, E2, and E1 as a close group, and may select, from A1, B1, C2, D3, E2, and E1 determined as the close group, an optimal path based on a location of an obstacle.

Here, the control unit 130 may add, to a heuristic set as elements, A1, B1, C2, D3, E2, and E1 determined as the close group.

That is, every time a user generates a path, the control unit 130 adds the search result to the heuristic function as an element. The control unit 130 may not significantly increase the number of elements through clustering so that a memory occupancy amount of the heuristic set may not increase.

The storage unit 150 may store electronic map data including map data for each area. Using the electronic map data, the control unit 130 may perform a path guide.

The present invention may further include a display unit capable of displaying a retrieved path together with the electronic map data, an audio output unit capable of outputting audio based on the path data displayed through the display unit, and the like.

Figure 6:
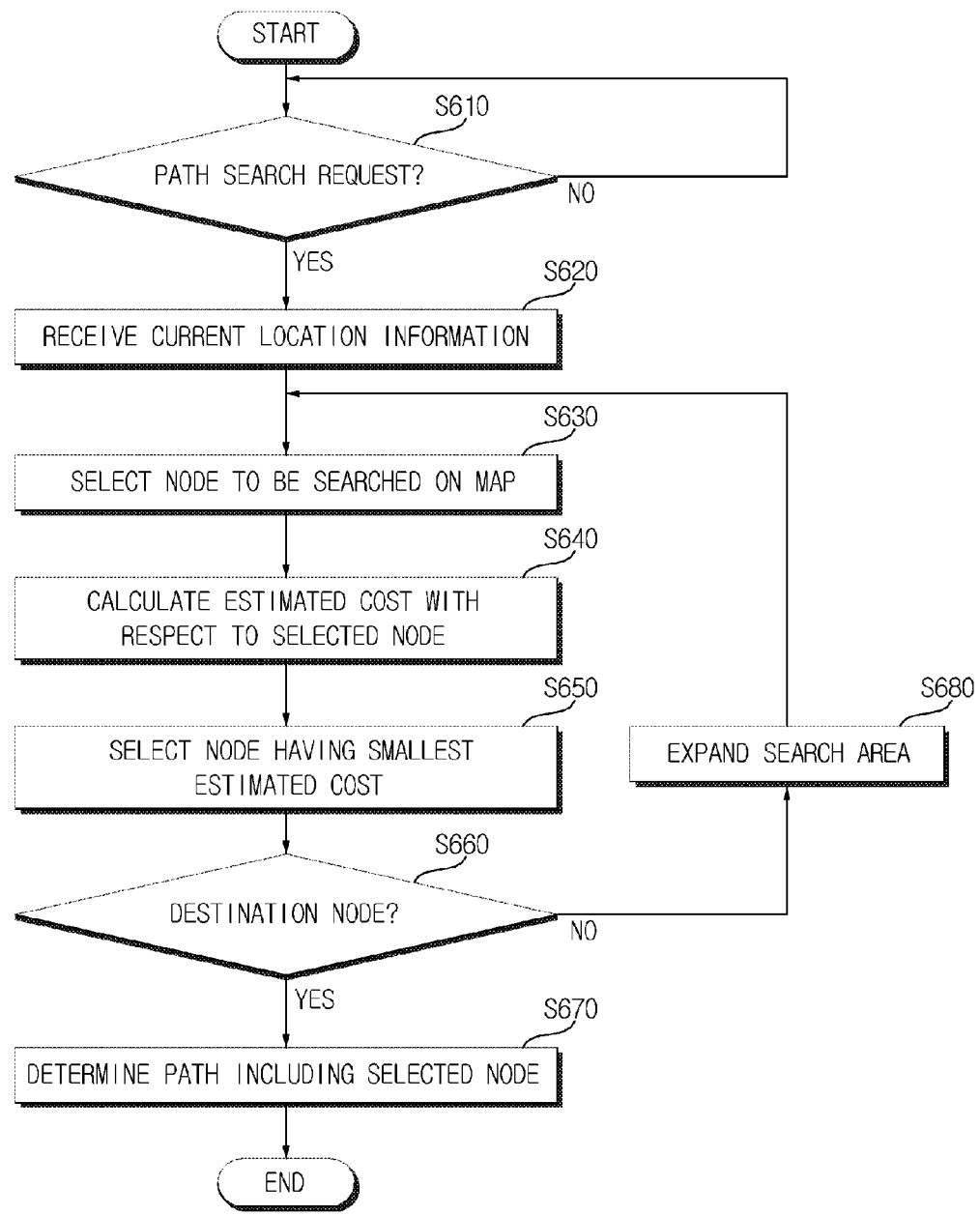
FIG. 6 is a flowchart illustrating a method for fast path search according to an exemplary embodiment of the present invention.

FIG. 6 is a flowchart illustrating a method for fast path search according to an exemplary embodiment of the present invention.

As shown in FIG. 6, when an apparatus for fast path search (hereinafter, referred to as a path search apparatus) according to the present invention receives destination information from a user and thereby receives a search request for a path to the received destination information (S610), the path search apparatus may receive current location information (S620).

Next, the path search apparatus may select neighbor nodes to be movable from a node corresponding to a current location on a map, using the destination information and the received current location information (S630).

Next, the path search apparatus may calculate an estimated cost by applying a learned heuristic evaluation function with respect to each of the selected neighbor nodes (S640), and may select, as a subsequent node to move, a node having a smallest estimated cost (S650).

Here, the learned heuristic evaluation function may calculate an estimated cost to a destination node while taking into consideration of an obstacle present in the path and the like, instead of a lineal distance to the destination node on the map.

Figure 7A:
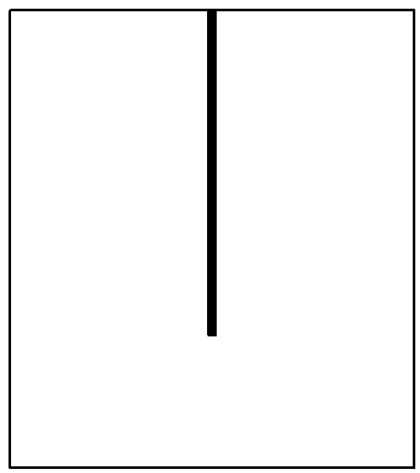
FIGS. 7A, 7B, and 7C are diagrams to describe a principle of calculating a cost according to an exemplary embodiment of the present invention.
Figure 7B:
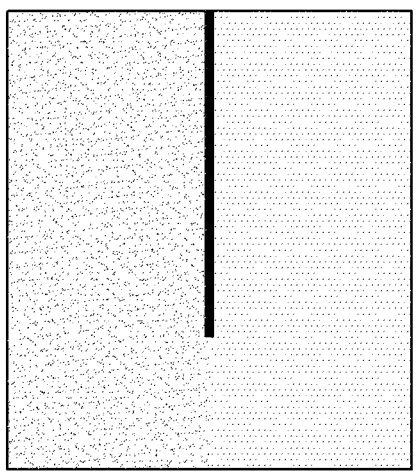
Figure 7C:
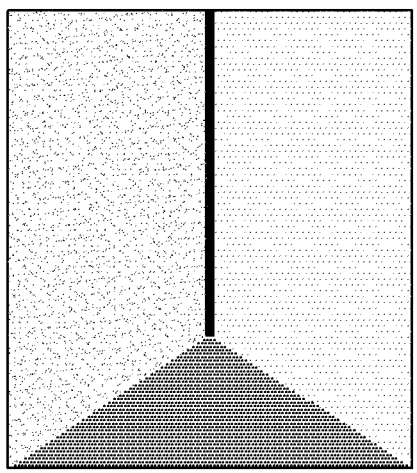

FIGS. 7A, 7B, and 7C are diagrams to describe a principle of calculating a cost according to an exemplary embodiment of the present invention.

As shown in FIGS. 7A, 7B, and 7C, an obstacle based distance varies based on locations of two nodes, and is not expressed by Equation 1 that indicates the lineal distance or the diagonal distance. Accordingly, the obstacle based distance may be used by storing a table or a heuristic set pre-calculated using a map.

TABLE 1

| Node #1 (n) | | Node #2 (g) | | Obstacle based distance |
|---|---|---|---|---|
| X | Y | X | Y | |
| A | 1 | B | 1 | 1.0 |
| A | 1 | E | 1 | 6.2 |
| B | 1 | C | 2 | 1.4 |
| ... | ... | ... | ... | ... |

However, when using the above method, a size of a distance table significantly increases based on a size of the map. A method using a distance weight may be used as a method to solve the above issue.

Specifically describing, when clustering adjacent nodes using the heuristic set, the given map may be space-divided as shown in FIGS. 7A, 7B, and 7C.

FIG. 7A shows a map before clustering in which a bold straight line indicates the obstacle. FIG. 7B shows a map after clustering that is divided into two spaces based on the obstacle of the bold straight line. FIG. 7C shows a map after clustering that is divided into three spaces based on the obstacle of the bold straight line.

A distance table indicating a distance weight w between the respective divided spaces, instead of a distance between the respective nodes after space division may be defined as shown in the following Table 2.

TABLE 2

| Node #1 (n) | Node #2 (g) | Distance weight (w) |
|---|---|---|
| Space 1 | Space 1 | 1.0 |
| Space 1 | Space 2 | 2.0 |
| Space 2 | Space 1 | 2.0 |
| Space 2 | Space 2 | 1.0 |

Here, the distance weight w may indicate a ratio of a distance between two divided spaces to the average lineal distance.

That is, the present invention may define the heuristic function as shown in the following Equation 3.

$$h(n,g) = w \times \sqrt{(n \cdot x - g \cdot x)^2 + (n \cdot y - g \cdot y)^2}$$ [Equation 3]

Here, n·x denotes an x value of a current node, g·x denotes an x value of a destination node, n·y denotes a y value of the current node, and g·y denotes a y value of the destination node.

Referring again to FIG. 3, it can be known that a cost from a node A to a node E is 6.2 as shown in Table 1. However, when using Equation 1 that is an existing heuristic function, the cost becomes 4. When using Equation 3 that is a newly proposed heuristic function, the cost becomes 8.

It can be known that an error of a cost calculated using Equation 1 is 2.2, and an error of a cost calculated using Equation 3 is 1.8. That is, even though the costs calculated using Equation 1 and Equation 3 have errors, it can be known that the error of the cost calculated using Equation 3 is relatively small.

Accordingly, without a need to pre-calculate and store a distance table, the present invention may divide a space and then define and store only a distance weight between the respective divided spaces, and thereby calculate a cost by applying the distance weight and a heuristic function to each node.

Next, when the node to move is selected, the path search apparatus may verify whether the selected node is a destination node (S660).

Next, when the selected node is the destination node, the path search apparatus may determine a path that includes the selected node. That is, at least one node may be included in the path.

On the contrary, when the selected node is not the destination node, the path search apparatus may expand a search area at a location of the selected node, that is, may select a neighbor node to be movable (S680) and may repeat a process of selecting a node to be searched, that is, a subsequent node to move from the expanded search area (S630).

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the apparatus and method for fast path search using a heuristic function according to the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for fast path search, comprising:
an input unit to receive current location information and destination information from a user, and to receive a search request for a path to the received destination information; and a control unit to search a map for a path from a start node corresponding to the current location information to a destination node corresponding to the destination information using a heuristic evaluation function,
wherein the heuristic evaluation function is expressed as a summation of a first cost to move from the start node to a current node on the path to the destination node, and a second cost to move from the current node to the destination node, the second cost including a cost that is calculated by multiplying a lineal distance from the current node to the destination node by a distance weight, and the path from the start node to the destination node is selected as a path for avoiding an obstacle on the map, and
wherein the distance weight divides the map into a plurality of spaces and indicates a ratio of a distance between two divided spaces to an average lineal distance.

2. The apparatus of claim 1, wherein:
the plurality of spaces are formed by clustering nodes on the map; and
the second cost is based on the distance weight which corresponds to a clustered space of the current node and a clustered space of the destination node.

3. The apparatus of claim 2, further comprising:
a learning unit to generate a heuristic set for the distance weight and update the heuristic set as path searching to the destination node is performed a predetermined number of times.

4. A method for fast path search, comprising:
receiving destination information from a user to receive a search request for a path to the received destination information;
obtaining current location information of the user when the search request for the path is received; and
searching a map for a path from a start node corresponding to the current location information to a destination node corresponding to the destination information using a heuristic evaluation function,
wherein the heuristic evaluation function is expressed as a summation of a first cost to move from the start node to a current node on the path and a second cost to move from the current node to the destination node, the second cost including a cost that is calculated by multiplying a lineal distance from the current node to the destination node by a distance weight, and the path from the start node to the destination node is selected as a path for avoiding an obstacle on the map,
wherein the distance weight divides the map into a plurality of spaces and indicates a ratio of a distance between two divided spaces to an average lineal distance.

5. The method of claim 4, wherein:
the plurality of spaces are formed by clustering nodes on the map; and
the second cost is based on the distance weight which corresponds to a clustered space of the current node and a clustered space of the destination node.

6. The method of claim 5, further comprising:
generating a heuristic set for the distance weight; and
updating the heuristic set as path searching to the destination node is performed a predetermined number of times.

* * * * *